United States Patent
Ikegaya (10) Patent No.: US 10,879,799 B2
(45) Date of Patent: Dec. 29, 2020

(54) POWER TRANSMISSION SYSTEM

(71) Applicant: Yazaki Corporation, Tokyo (JP)

(72) Inventor: Koji Ikegaya, Makinohara (JP)

(73) Assignee: Yazaki Corporation, Tokyo (JP)

( * ) Notice: Subject to any disclaimer, the term of this patent is extended or adjusted under 35 U.S.C. 154(b) by 18 days.

(21) Appl. No.: 16/269,696

(22) Filed: Feb. 7, 2019

(65) Prior Publication Data

US 2019/0245438 A1 Aug. 8, 2019

(30) Foreign Application Priority Data

Feb. 8, 2018 (JP) ................................ 2018-021013

(51) Int. Cl.
*H02M 3/155* (2006.01)
*H02M 1/00* (2006.01)

(52) U.S. Cl.
CPC ............. *H02M 3/155* (2013.01); *H02M 1/00* (2013.01); *H02M 2001/0048* (2013.01); *H02M 2001/0074* (2013.01)

(58) Field of Classification Search
CPC ......... H02M 3/155; H02M 2001/0074; H02M 2001/0048; H02M 1/00; H02M 2001/009; H02J 1/10; H02J 3/14; H02J 2310/14; B60R 16/0315; B60R 16/03; B60R 16/02
See application file for complete search history.

(56) References Cited

U.S. PATENT DOCUMENTS

| | | | | |
|---|---|---|---|---|
| 4,264,960 | A * | 4/1981 | Gurr | H02J 3/14 307/40 |
| 10,148,173 | B1 * | 12/2018 | Wang | H02M 3/156 |
| 2002/0053943 | A1 * | 5/2002 | Yamasaki | G11C 29/50 327/538 |
| 2003/0030328 | A1 | 2/2003 | Tamai et al. | |
| 2008/0080103 | A1 * | 4/2008 | Paillet | H02M 3/158 361/18 |
| 2017/0264198 | A1 * | 9/2017 | Li | H02M 3/158 |
| 2018/0131283 | A1 * | 5/2018 | Ono | G06F 1/26 |

(Continued)

FOREIGN PATENT DOCUMENTS

| | | | |
|---|---|---|---|
| JP | H05-122846 A | | 5/1993 |
| JP | H05122846 A | * | 5/1993 |
| JP | 2003-048496 A | | 2/2003 |

(Continued)

*Primary Examiner* — Pinping Sun
(74) *Attorney, Agent, or Firm* — Banner & Witcoff, Ltd.

(57) ABSTRACT

A power transmission system is provided. In the power transmission system, a plurality of power supply voltages are switched alternately and periodically, and is sent from an upstream module unit toward a downstream control unit as one system of output voltage. In the downstream control unit, a plurality of voltages from the inputted voltage is separated and supplied to loads, and the voltage is monitored so as to determine switching timing. Further, the downstream control unit is equipped with capacitors for each system of voltages, and thereby the voltages are maintained even during a time period when no power is supplied from the upstream module unit. A low voltage required by a CPU of the downstream control unit is generated by a voltage regulator of the downstream control unit. The power loss that is caused in generating power to be consumed by low-voltage loads can be reduced.

5 Claims, 3 Drawing Sheets

(56) References Cited

U.S. PATENT DOCUMENTS

2018/0181230 A1\* 6/2018 Chang .................. G06F 3/0416

FOREIGN PATENT DOCUMENTS

| JP | 2009-178006 A | | 8/2009 | |
|----|---------------|---|--------|---|
| JP | 2009178006 A | \* | 8/2009 | |
| JP | 2015-047012 A | | 3/2015 | |
| WO | WO-2013170808 A1 | \* | 11/2013 | ........ H02M 3/33576 |

\* cited by examiner

POWER TRANSMISSION SYSTEM

CROSS-REFERENCE TO RELATED APPLICATIONS

This application is based on and claims priority under 35 USC 119 from Japanese Patent Application No. 2018-021013 filed on Feb. 8, 2018, the contents of which are incorporated herein by reference.

TECHNICAL FIELD

The present invention relates to a power transmission system that can be used for transmission of DC power (power source power) in a vehicle, for example.

BACKGROUND ART

Various electric devices installed in a vehicle require, in many cases, plural kinds of DC power of different voltages such as 5 V and 12 V. Thus, usually, power sources are connected to electric devices (loads) using electric wires that are independent of each other for the respective voltages.

For example, Patent document 1 discloses a power distribution system in which an output voltage 42 V of a power source is converted into 12 V by a converter that is disposed at a position of an intermediate connector and the voltage 12 V is then converted into 5 V by a regulator that is disposed inside a downstream ECU (electronic control unit).

For another example, Patent document 2 discloses a power source system that, to increase the efficiency of the entire system, enables mode selection and series connection of plural DC power sources.

PRIOR ART DOCUMENTS

Patent Documents

Patent document 1: JP-A-2003-48496
Patent document 2: JP-A-2015-47012

SUMMARY OF INVENTION

However, where plural systems of power that are different in voltage are supplied from power sources to loads, they are necessarily transmitted using electric wires that are independent of each other for the respective voltages. Thus, the number of electric wires constituting a wire harness cannot be decreased and its weight cannot be reduced. Furthermore, it is difficult to, for example, reduce the component cost of a wire harness and save the labor of wiring work.

Where voltage conversion is performed by a converter and a regulator as disclosed in Patent document 1, the number of electric wires for connection between a power source and loads can be decreased because plural voltages can be generated from one voltage. However, where an input voltage in such a wide range as, for example, from 10 to 16 V is converted into an output voltage of, for example, 5 V using a regulator, problems arise that a large power loss occurs in the regulator and the regulator itself and circuit components accompanying it are increased in size. Furthermore, since the DC-DC converter which is relatively small in loss is expensive because of a large number of components, systems cannot be employed in which a number of DC-DC converters are provided for respective loads.

The present invention has been made in view of the above circumstances, and an object of the invention is therefore to provide a power transmission system that, in a case of supplying power from a power source device to loads that require plural power supply voltages, can decrease the number of electric lines for connection between the power source and the loads and suppress increase of power losses of voltage conversions.

To attain the above object, the present invention provides a power transmission system having features that are described below in the form of items (1) to (5):

(1) A power transmission system including:
a downstream control module which controls plural loads that require different power supply voltages;
an upstream module driver which supplies a prescribed power to the downstream control module; and
a power connection line which connects the upstream module driver to the downstream control module,
wherein the upstream module driver includes:
plural power sources capable of sending different power supply voltages; and
a voltage switching control unit which selects, in order or alternately and periodically, the power supply voltages that are output from the plural power sources and sends the selected power supply voltages to the power connection line; and
wherein the downstream control module includes:
a voltage extraction control unit which extracts at least one of the power supply voltages from power transmitted by the power connection line; and
plural voltage output portions which output plural power supply voltages including the power supply voltage extracted by the voltage extraction control unit to the plural respective loads.

According to the power transmission system having the configuration of item (1), since the upstream module driver sends the power supply voltages to the power connection line while selecting between them in order or alternately and periodically, it is not necessary to prepare power connection lines that are independent of each other for the respective voltages. That is, power supply voltages can be transmitted from the upstream module driver to the downstream control module by only the single power connection line. The downstream control module needs to merely extract necessary voltages from the power supply voltages appearing on the common power connection line. Thus, it is not necessary to perform special voltage reduction processing using a regulator or the like and hence the power loss can be reduced to a large extent.

(2) The power transmission system according to item (1), wherein the voltage switching control unit selects the power supply voltages in order or alternately and periodically at a constant period and sends the selected power supply voltages to the power connection line.

According to the power transmission system having the configuration of item (2), since the power supply voltages appear on the power connection line repeatedly at the constant period, an event that a necessary voltage is not supplied for a long time can be prevented in each unit of the downstream control module. Thus, the downstream control module can output stable voltages.

(3) The power transmission system according to item (1) or (2), wherein the voltage extraction control unit monitors a voltage of the power inputted from the power connection line to the downstream control module, identifies a difference of voltage at a timing, and extracts at least one of the power supply voltages.

According to the power transmission system having the configuration of item (3), the downstream control module can extract necessary voltages even if the upstream module driver and the downstream control module communicate with each other for timing adjustments.

(4) The power transmission system according to any one of items (1) to (3), wherein each of the plural voltage output portions has an electric energy storing units which receives and stores power of each of the power supply voltages extracted by the voltage extraction control unit.

According to the power transmission system having the configuration of item (4), by virtue of the operation of the electric energy storing units, necessary power supply voltages can be supplied to the downstream load even in a time period when a desired voltage is not supplied from the upstream side. Furthermore, smoothed and stable voltages can be output.

(5) The power transmission system according to any one of items (1) to (4), wherein at least one of the plural voltage output portions has a switching element which prevents input or output of a high voltage when a voltage higher than or equal to a prescribed value appears on the power connection line.

According to the power transmission system having the configuration of item (5), an event that an excessive voltage is supplied from the power connection line to the voltage output portion that deals with a relatively low voltage can be prevented. Where an input voltage is lowered using a regulator or the like, increase of the loss occurring in the regulator can be suppressed.

In a case of supplying power from a power source device to loads that require plural power supply voltages, the power transmission system according to the invention can decrease the number of electric lines for connection between the power source and the loads and suppress increase of power losses of voltage conversions.

The invention has been described above concisely. The details of the invention will become more apparent when the modes for carrying out the invention (hereinafter referred to as an embodiment) described below are read through with reference to the accompanying drawings.

DESCRIPTION OF EMBODIMENTS

A specific embodiment of the present invention will be hereinafter described with reference to the drawings.
<Configuration of Power Transmission System>

Figure 1:
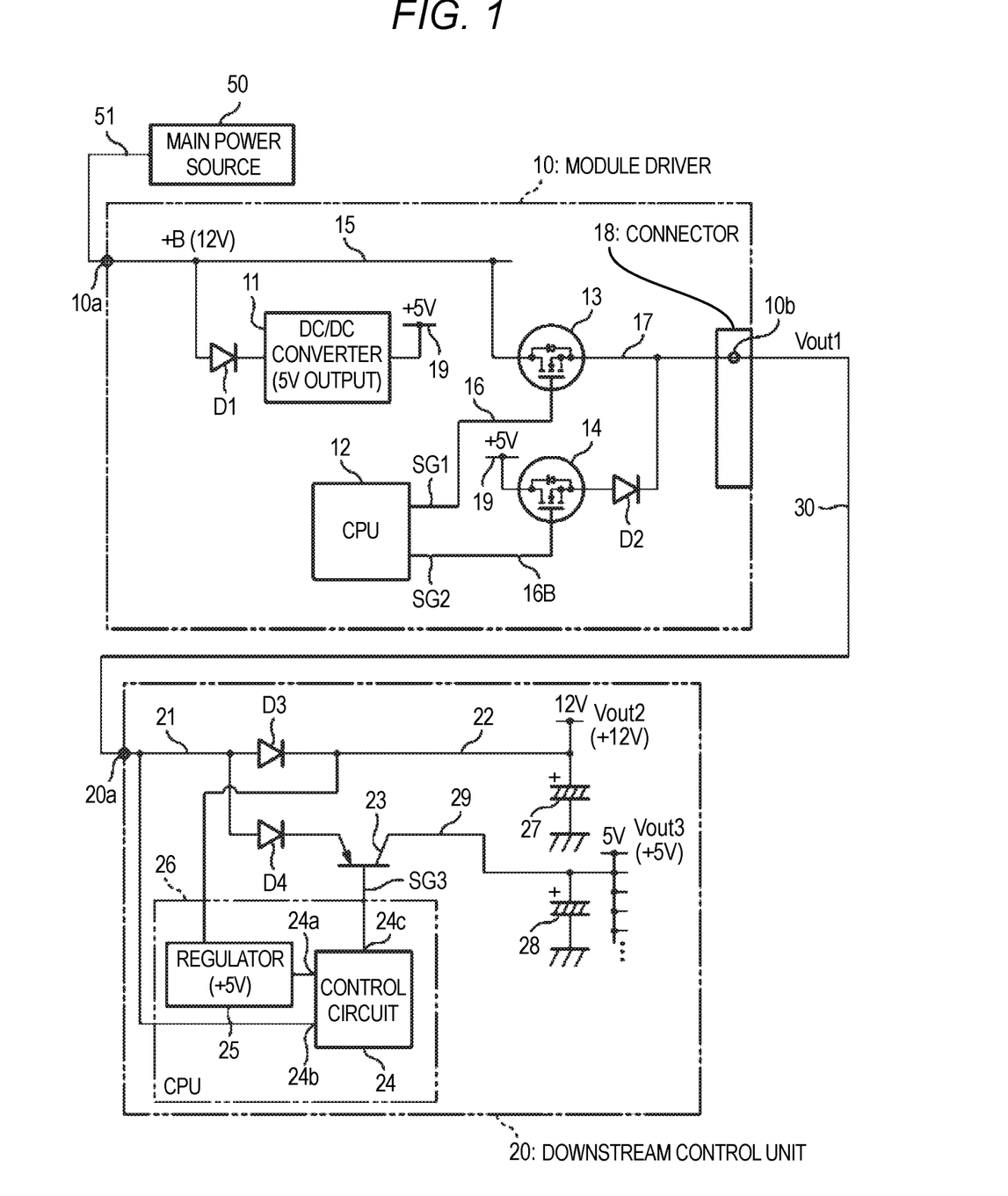
FIG. 1 is a block diagram showing a configuration example 1 of a power transmission system.

FIG. 1 shows a configuration example 1 of a power transmission system. The power transmission system shown in FIG. 1 is installed in a vehicle such as an automobile and used for supplying DC power from a main power source 50 such as a vehicle battery to various loads etc. installed in the vehicle. Specific example loads are motors of accessories, lamps, and heaters that require 12 V and sensors, electronic circuits, etc. that require a stable 5-V voltage.

The power transmission system shown in FIG. 1 is equipped with a module driver 10 and a downstream control unit 20. The module driver 10 and the downstream control unit 20 are connected to each other by a single power connection line 30. The module driver 10 is disposed at a position close to the main power source 50 and the downstream control unit 20 is disposed at a position close to the loads.

For example, the power connection line 30 is installed in the vehicle in such a manner as to be incorporated in a wire harness as one of many electric wires. It is assumed that the downstream control unit 20 is configured so as to serve as, for example, a connector having a control function in a state that it is incorporated in a housing of one connector that is connected to the downstream side of the wire harness. It goes without saying that the downstream control unit 20 may be configured in different form.

Where the loads require two power supply voltages 12 V and 5 V as in the power transmission system shown in FIG. 1, a common configuration requires plural power lines that are independent of each other for the respective voltages instead of the power connection line 30. The power transmission system shown in FIG. 1 has such a special configuration as to require only a single power connection line 30. This makes it possible to decrease the number of electric wires constituting a wire harness.

For another example, where a reduced output voltage 5 V is generated from an input voltage 12 V using a common voltage regulator or resistors, a large power loss occurs in the voltage regulator particularly in the case where the input voltage has a wide voltage variation range. In view of this, the power transmission system shown in FIG. 1 has a special configuration for suppressing a power loss due to voltage conversion. The 5-V power supply voltage which is output from the downstream control unit 20 is also used as a power supply voltage for electronic circuits inside itself.
<Outline of Configuration and Operation of Module Driver 10>

The module driver 10 shown in FIG. 1 includes a DC-DC converter 11, a CPU (microcomputer) 12, switching devices 13 and 14, diodes D1 and D2, and a connector 18.

The diodes D1 and D2 are provided to prevent an erroneous operation due to a reverse current flow. The DC-DC converter 11 can output a stable DC 5 [V] voltage by converting a DC voltage. A 12 [V] power source voltage (+B) that is supplied from the main power source 50 is applied to the DC-DC converter 11 via a power connection line 51, an input terminal 10a, a power line 15, and the diode D1. The 5 [V] voltage generated by the DC-DC converter 11 is supplied to a power line 19.

The CPU 12 performs operations that are necessary to control the module driver 10 by running programs that are incorporated therein in advance. More specifically, the CPU 12 outputs control signals SG1 and SG2 that are necessary to control the switching devices 13 and 14. As described later, the control signals SG1 and SG2 are periodic binary signals. Since the operation of the CPU 12 is relatively simple, it may be replaced by dedicated hardware (signal generation circuit).

The switching devices 13 and 14 are MOS field-effect transistors (FETs) and are used for power switching. The switching device 13 is connected between the power line 15 and a power line 17. Further, the switching device 14 is connected between the power lines 19 and 17. The control signal SG1 is applied to the control input terminal (gate terminal) of the switching device 13 via a control line 16. The control signal SG2 is applied to the control input terminal of the switching device 14 via a control line 16B.

The switching device 13 is turned on and off repeatedly according to the control signal SG1, and outputs the voltage (12V) of the power line 15 to the power line 17. Further, the switching device 14 is turned on and off repeatedly according to the control signal SG2, and outputs the voltage (5V) of the power line 19 to the power line 17.

The two control signals SG1 and SG2 are opposite to each other in phase. Thus, voltages 12 V and 5 V appear alternately and periodically on the power line 17. This output signal Vout1 is output to the power connection line 30 from an output terminal 10b of the connector 18.

<Outline of Configuration and Operation of Downstream Control Unit 20>

The downstream control unit 20 shown in FIG. 1 includes a switching transistor 23, a control circuit 24, capacitors 27 and 28, diodes D3 and D4, and output portions for outputting respective output voltages Vout2 and Vout4. The downstream control unit 20 also includes a CPU 26 which incorporates the control circuit 24 and a small-size voltage regulator 25.

The diodes D3 and D4 are provided to prevent an erroneous operation due to a reverse current flow. The CPU 26 performs operations for controlling the downstream control unit 20 by running programs that are incorporated therein in advance. More specifically, the control circuit 24 in the CPU 12 monitors the voltage on the power line 21 using its analog voltage monitoring terminal 24b and generates a control signal SG3 that rises and falls in synchronism with a detected voltage. A stable DC voltage (5V) that is output from the voltage regulator 25 is applied to a power input terminal 24a of the control circuit 24.

The voltage regulator 25 generates a 5V DC voltage on the basis of a voltage (a 12V voltage that is approximately a DC voltage) appearing on a power line 22.

The switching transistor 23 is turned on and off repeatedly according to the control signal SG3 which is output from the control circuit 24 of the CPU 26. Thus, when the control signal SG3 is at a low level (L), the switching transistor 23 outputs, to a power line 29, the voltage on the power line 21 that is received via the diode D4. When the control signal SG3 is at a high level (H), the switching transistor 23 is turned off and supplies no power to the power line 29.

One system of power is supplied from the module driver 10 to the power line 21 at an input terminal 20a via the power connection line 30. The power supplied to the power line 21 is then supplied to the power line 22 via the diode D3 and supplied to the power line 29 via the diode D4 and the switching transistor 23.

Each of the capacitors 27 and 28 is an electrolytic capacitor and has a sufficiently large electric energy storage capacity. The capacitor 27 stores DC power that is supplied from the upstream power line 21 to the power line 22, and outputs a DC voltage that is approximately equal to 12V in a steady state as the output voltage Vout2.

In actuality, since 5V and 12V appear alternately and periodically on the power line 21, the capacitor 27 is charged (power is stored there) via the diode D3 while 12V appears on the power line 21. Thereby, the electric power is stored.

The capacitor 28 stores DC power that is supplied from the upstream power line 21 to the power line 29, and outputs a DC voltage that is approximately equal to 5V in a steady state as the output voltage Vout3. In actuality, 5V and 12V appear alternately and periodically on the power line 21. The control signal SG3 has a low level (L) and the switching transistor 23 is turned on only while 5V appears on the power line 21. As a result, the capacitor 28 is charged (power is stored there) via the diode D4, the switching transistor 23, and the power line 29.

Thus, as shown in FIG. 1, the downstream control unit 20 can supply either 5V or 12V power supply voltage to the plural loads (not shown). Grounding can be made using a ground line that is included in the wire harness, for example, or a body ground in the case where the vehicle body is made of a metal.

<Operation Example of System>

Figure 2:
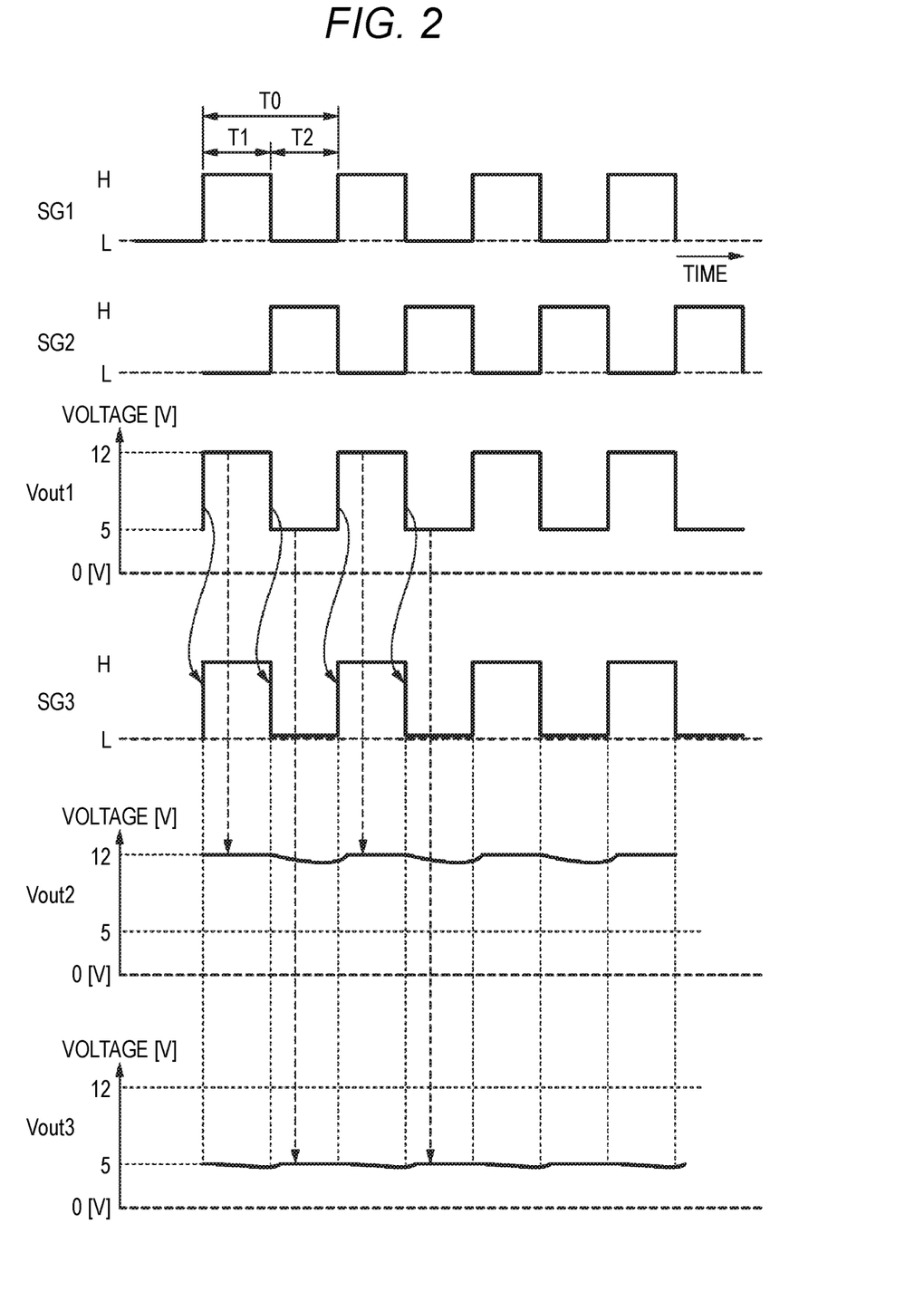
FIG. 2 is a time chart showing an operation example of the power transmission system in FIG. 1.

FIG. 2 shows an operation example of the power transmission system shown in FIG. 1. In the example operation shown in FIG. 2, each of the control signals SG1 and SG2 which are output from the CPU 12 is a binary signal that varies in the same manner at a constant period T0. The interval T1 in which the voltage of the control signal SG1 is at the high level H is the same as the interval T2 in which it is at the low level L. The voltage of the control signal SG2 is at the low level L while that of the control signal SG1 is at the high level H, and vice versa.

In the module driver 10 shown in FIG. 1, when the control signal SG1 is at the high level H, the switching device 13 is turned on and hence the same voltage (12V) as the voltage of the power line 15 appears as the output voltage Vout1. That is, 12V is supplied to the power line 17 and the power connection line 30 in each interval T1.

Further, when the control signal SG2 is at the high level H, the switching device 14 is turned on and hence the same voltage (5V) as the voltage of the power line 19 appears as the output voltage Vout1. That is, 5V is supplied to the power line 17 and the power connection line 30 in each interval T2.

On the other hand, in the downstream control unit 20, the CPU 26 monitors the input voltage of the power line 21 which is the same as the output voltage Vout1. And the CPU 26 generates the control signal SG3 that rises and falls in synchronism with the output voltage Vout1. That is, as shown in FIG. 2, the control signal SG3 is at the high level H when the output voltage Vout1 is equal to 12V, and it is at the low level L when the output voltage Vout1 is equal to 5V.

For example, when the voltage across the terminals of the capacitor 27 becomes lower than 12V in a state that the voltage of the power line 21 is equal to 12V, the diode D3 becomes conductive, whereby power is supplied from the power connection line 30 to the power line 22 via the power line 21 and the diode D3 and the capacitor 27 is charged. In this manner, the output voltage Vout2 is kept at the prescribed voltage (in this case, 12V).

Further, when the voltage of the power line 21 is equal to 5V, no power is supplied from the power line 21 to the capacitor 27 even if the voltage across its terminals lowers. Thus, the capacitor 27 is discharged gradually according to a current flowing toward the loads etc. and the output voltage Vout2 lowers a little according to a certain time constant. When the interval T2 has finished and 12V appears again on the power line 21, the capacitor 27 is charged and the output voltage Vout2 recovers, that is, becomes equal to 12V.

Furthermore, when the voltage of the power line 21 is equal to 5V, the control signal SG3 is at the low level L and the switching transistor 23 is turned on, as a result of which a current flows from the power line 21 to the capacitor 28 via the diode D4, the switching transistor 23, and the power line 29 and the capacitor 28 is charged. That is, in each interval T2, the output voltage Vout3 is kept at 5V by the 5V voltage appearing as the output voltage Vout1.

On the other hand, when the voltage of the power line 21 is equal to 12V, the control signal SG3 is at the high level H and the switching transistor 23 is turned off, as a result of which no current flows through the power line 29 and the capacitor 28 is not charged. Thus, in each interval T1, the capacitor 28 is discharged gradually according to a current flowing toward the loads etc. and the output voltage Vout3 lowers a little according to a certain time constant. When the interval T1 has finished and 5V appears again on the power line 21, the capacitor 28 is charged and the output voltage Vout3 recovers, that is, becomes equal to 5V.

As described above, since the voltage Vout1 of power that is transmitted by the power connection line 30 is switched alternately between 5V and 12V, a small voltage variation occurs in each of the two systems of output voltages Vout2 and Vout3. Adjustments would therefore be necessary to prevent an erroneous operation or reduction in accuracy from occurring in the loads taking into consideration the magnitudes of the loads connected to the output terminals of the downstream control unit 20 and rated voltages and allowable voltage ranges of the loads. That is, it would be necessary to adjust the capacitances of the capacitors 27 and 28, the period T0, and the ratio T1/T2.

<Operation in Initial State>

In the power transmission system shown in FIG. 1, power (5V) that is necessary for the CPU 26 in the downstream control unit 20 is generated by the voltage regulator 25 on the basis of the 12V voltage on the power line 22. However, if the capacitor 27 is discharged fully in an initial state, the voltage of the power line 22 is close to 0 V and hence the CPU 26 does not operate.

In view of the above, the circuit involved is designed in advance so that the voltage at the control output terminal 24c is at the high level H in a state that the CPU 26 is not operational. This prevents a voltage that is higher than 5 V from being supplied to the power line 29 from the power line 21.

Even if the CPU 26 has not been operational, when a certain time elapses from a start of supply of power from the power connection line 30 to the power connection line 30, the capacitor 27 is charged and the voltage of the power line 22 rises to about 12V. As a result, the voltage regulator 25 starts to output 5V and the CPU 26 starts to operate. Thus, the switching transistor 23 is turned on and the capacitor 28 is charged, whereby the output voltage Vout3 of the power line 29 can be increased to 5V.

<Advantages of Configuration of FIG. 1>

In the power transmission system shown in FIG. 1, even in the case where loads that require plural power supply voltages are connected to the output side of the downstream control unit 20, since the module driver 10 outputs, to the power connection line 30, a voltage waveform that switches between plural voltages (5V and 12V) alternately and periodically, the module driver 10 can be connected to the downstream control unit 20 by only the single power connection line 30. Thus, the number of electric wires constituting the wire harness including the power connection line 30 can be decreased.

Furthermore, in the power transmission system shown in FIG. 1, although power loss occurs in the voltage regulator 25 which generates the 5V voltage that is necessary for the CPU 26, the loss of the other power to be consumed by 5V loads can be reduced to a large extent because no voltage conversion is necessary in the downstream control unit 20 to generate it. Thus, the voltage regulator 25 can be miniaturized.

<Modification>

Figure 3:
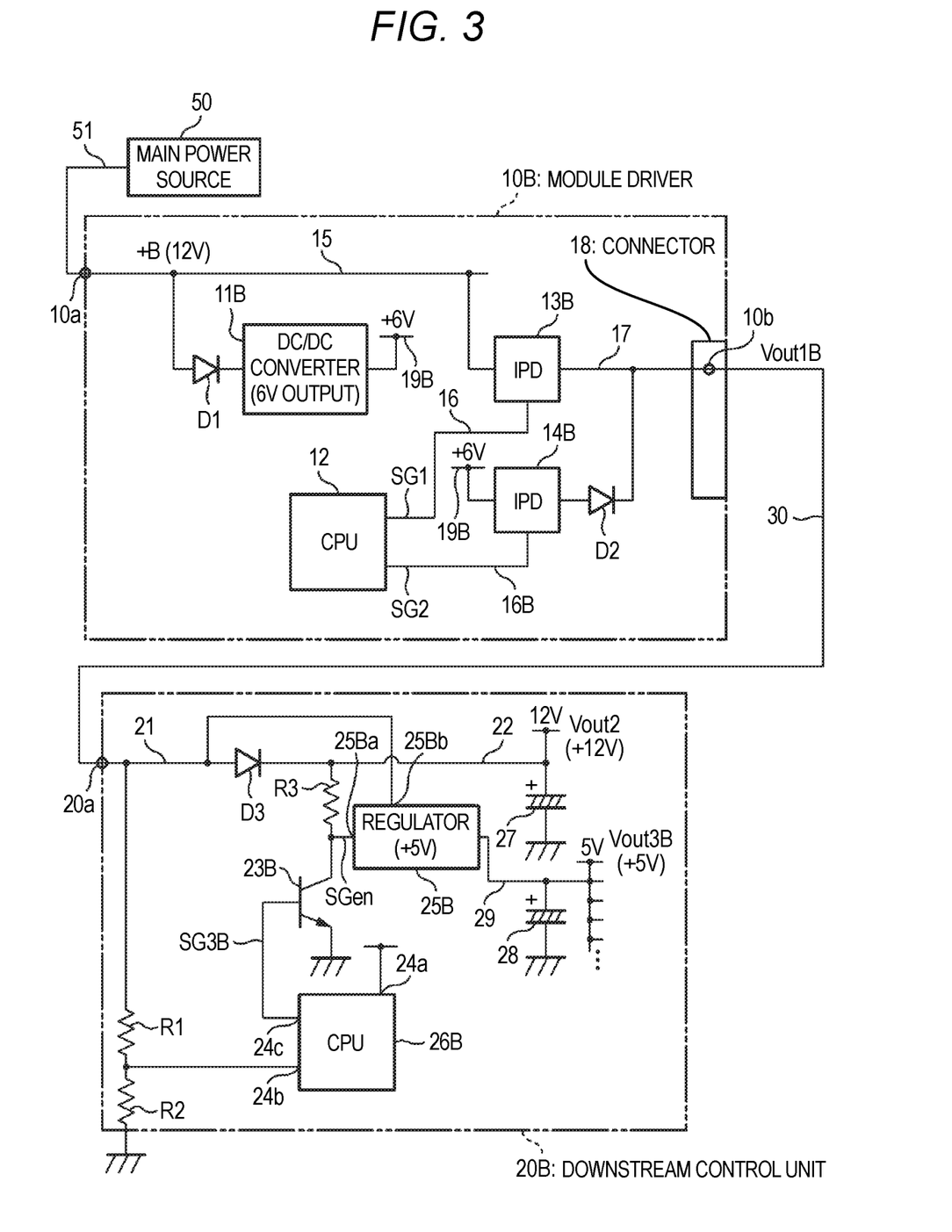
FIG. 3 is a block diagram showing a configuration example 2 of the power transmission system.

FIG. 3 shows a configuration example 2 of the power transmission system. The power transmission system shown in FIG. 3 is a modification of that shown in FIG. 1, that is, a module driver 10B and a downstream control unit 20B are a little different in configuration from the module driver 10 and the downstream control unit 20 shown in FIG. 1. Modified portions will be described below.

The power transmission system shown in FIG. 3 includes the module driver 10B and the downstream control unit 20B. In the module driver 10B, a DC-DC converter 11B outputs a 6V voltage, that is, a voltage that is a little higher than 5V that is necessary for 5V loads etc.

The module driver 10B employs IPDs (intelligent power devices) 13B and 14B in place of the respective switching devices 13 and 14. The IPD 13B is connected between the power line 15 and the power line 17. The IPD 14B is connected between a power lines 19B and the power line 17. A control signal SG1 is applied to the control input terminal of the IPD 13B. A control signal SG2 is applied to the control input terminal of the IPD 14B.

Thus, two voltages 12V and 5V appear alternately and periodically in an output voltage Vout1B which is output from the connector 18 of the module driver 10B to the power connection line 30. The output voltage Vout1B has approximately the same waveform as the output voltage Vout1 shown in FIG. 2.

On the other hand, the downstream control unit 20B is equipped with a voltage regulator 25B to generate 5V power supply voltage that is necessary for 5V loads etc. The voltage regulator 25B is even smaller than the voltage regulator 25 shown in FIG. 1 and has a function of generating a 5V output voltage on the basis of an input voltage that is approximately equal to 6 V. Unlike ordinary regulators, the voltage regulator 25B has a control input terminal 25Ba which is used for on/off-switching the operation of the voltage regulator 25B.

A switching transistor 23B and a resistor R3 are provided to generate an enable control signal SGen that is to be applied to the control input terminal 25Ba of the voltage regulator 25B. A control signal SG3B generated by the CPU 26B is applied to the control input terminal (base terminal) of the switching transistor 23B. The collector terminal of the switching transistor 23B is connected to the power line 22 via a resistor R3. The emitter terminal of the switching transistor 23B is grounded. The enable control signal SGen is generated as the switching transistor 23B is turned on and off.

The CPU 26B operates approximately in the same manner as the CPU 26. In the example shown in FIG. 3, the voltage of the power line 21 is divided by resistors R1 and R2 and a resulting divisional voltage is applied to an analog voltage monitoring terminal 24b of the CPU 26B. The control signal SG3B is generated in synchronism with a voltage that is applied to the analog voltage monitoring terminal 24b. A power input terminal 24a of the CPU 26B is connected to a power line 29.

The operation state of the voltage regulator 25B reflects the state of the enable control signal SGen. In a steady state, the voltage regulator 25B is turned off while a 12V voltage appears on the power line 21 and is turned on while a 6V voltage appears on the power line 21. Thus, the capacitor 28 is charged by a 5V voltage that is output from the voltage regulator 25B only in intervals (corresponding to the intervals T2 shown in FIG. 2) when the output voltage Vout1B which is supplied via the power connection line 30 is equal to 6V.

In intervals (corresponding to the intervals T1 shown in FIG. 2) when the output voltage Vout1B which is supplied via the power connection line 30 is equal to 12 V, the voltage regulator 25B is turned off and hence no power is supplied from the voltage regulator 25B to the capacitor 28.

The reason why the voltage regulator 25B is turned off in the intervals when the output voltage Vout1B is equal to 12V is avoid increase of unnecessary power loss. That is, by turning on the voltage regulator 25B only in the intervals when the output voltage Vout1B is equal to 6V, the voltage difference between its input side and output side is made smaller (to 1V) and the power loss due to the voltage conversion is reduced to a large extent.

If the capacitor 28 is discharged fully in an initial state, the voltage of the power line 29 is equal to about 0 V and hence the CPU 26B does not operate. In view of this, the circuit involved is designed in advance so that the enable control signal SGen causes the switching transistor 23B to be always on. As a result, only in the initial state, the voltage regulator 25B can generate a 5V output voltage on the basis of the output voltage Vout1B in every interval and thereby charge the capacitor 28.

When the voltage of the power line 29 increases in an initial state, the CPU 26B starts to operate in due course. As a result, the switching transistor 23B receives a control signal SG3B and generates an ordinary enable control signal SGen. Thus, the voltage regulator 25B enters an intermittent drive mode in which it does not operate in the intervals when the output voltage Vout1B is equal to 12V.

That is, in the initial state, the voltage regulator 25B operates all the time and hence a large power loss occurs in lowering the voltage from 12V to 5V. However, since the initial state is short and the power loss becomes small after establishment of a steady state, no large power loss occurs in the voltage regulator 25B even when relatively large power is supplied to 5V loads. Furthermore, since a large power loss occurs only in a very short time, the voltage regulator 25B can be miniaturized.

Since the voltage regulator 25B is used to generate the output voltage Bout3B that is to be supplied to 5V loads, the power transmission system having the configuration shown in FIG. 3 can be provided with a protective function against a failure of a load or the CPU 26B, for example. That is, the circuit can by shut off automatically in the event of an abnormally large load current, overheating, or the like.

The values of the above-mentioned output voltages Vout1, Vout2, and Vout3 and the specifications of the control period and intervals (T0, T1, and T2) etc. may be changed when necessary. The same is true of the capacitances of the respective capacitors 27 and 28 and the circuit time constants.

Features of the above-described power transmission system according to the embodiment of the present invention will be summarized below concisely in the form of items [1] to [5]:

[1] A power transmission system characterized by comprising:
a downstream control module (downstream control unit 20) which controls plural loads that require different power supply voltages;
an upstream module driver (module driver 10) which supplies prescribed power to the downstream control module; and
a power connection line (30) which connects the upstream module driver to the downstream control module,
wherein the upstream module driver comprises:
plural power sources (power line 15, DC-DC converter 11) capable of sending different power supply voltages; and
a voltage switching control unit (switching devices 13 and 14) which selects, in order or alternately and periodically, the power supply voltages that are output from the plural power sources and sends the selected power supply voltages to the power connection line; and
wherein the downstream control module includes:
a voltage extraction control unit (switching transistor 23) which extracts at least one of the power supply voltages from power transmitted by the power connection line; and
plural voltage output portions (output portions of Vout2 and Vout3) which output plural power supply voltages including the at least one power supply voltage extracted by the voltage extraction control unit to the plural respective loads.

[2] The power transmission system according to item [1], wherein the voltage switching control unit selects the power supply voltages in order or alternately and periodically at a constant period (T0) and sends the selected power supply voltages to the power connection line (refer to the output voltage Vout1 shown in FIG. 2).

[3] The power transmission system according to item [1] or [2], wherein the voltage extraction control unit (CPU 26) monitors a voltage of the power inputted from the power connection line to the downstream control module, identifies a difference of voltage at a timing, and extracts at least one of the power supply voltages (refer to the control signal SG3 and the output voltages Vout1 and Vout3).

[4] The power transmission system according to any one of items [1] to [3], wherein the plural voltage output portions have respective electric energy storing units (capacitors 27 and 28) each of which stores electric energy by receiving power corresponding to one of the power supply voltages extracted by the voltage extraction control unit.

[5] The power transmission system according to any one of items [1] to [4], wherein at least one of the plural voltage output portions has a switching element (switching transistor 23 or 23B) which prevents input or output of a high voltage when a voltage higher than or equal to a prescribed value appears on the power connection line.

What is claimed is:

1. A power transmission system comprising:
a downstream control module circuit which controls two types of loads that require different two types of power supply voltages;
an upstream module driver circuit which supplies a prescribed power to the downstream control circuit; and
a power connection line which connects the upstream module driver circuit to the downstream control circuit,
wherein the upstream module driver circuit includes:
two types of power sources capable of outputting the different two types of power supply voltages; and
a voltage switching control circuit which selects, in order or alternately and periodically, the different two types of power supply voltages that are outputted from the two types of power sources and sends the selected different two types of power supply voltages to the power connection line;
wherein the downstream control circuit includes:
a voltage extraction control circuit which extracts at least one of the different two types of power supply voltages from power transmitted by the power connection line; and
two types of voltage output portions which output the extracted two types of power supply voltages including the at least one of the different two types of power supply voltages extracted by the voltage extraction control circuit to each of the two types of loads, wherein the two types of voltage output portions include
a first power supply voltage type of voltage output portion and a second power supply type of voltage output portion, and the first power supply voltage is higher than the second power supply voltage, and wherein the voltage extraction control circuit includes:
a voltage regulator which generates, based on the first power supply voltage that appears on the first power supply voltage type of voltage output portion, a constant voltage lower than the first power supply voltage, and a control circuit in which the constant voltage generated by the voltage regulator is applied and which generates a control signal so as to extract at least one of the two types of power supply voltages.

2. The power transmission system according to claim 1, wherein the voltage switching control circuit selects the different two types of power supply voltages in order or alternately and periodically at a constant period and sends the selected different two types of power supply voltages to the power connection line.

3. The power transmission system according to claim 1, wherein the voltage extraction control circuit monitors a voltage of the power inputted from the power connection line to the downstream control circuit, identifies a difference of monitored voltages at a timing, and extracts at least one of the different two types of power supply voltages.

4. The power transmission system according to claim 1, wherein each of the plurality two types of voltage output portions has an electric energy storing circuit unit which receives and stores power of each of the extracted at least one of the different two types of power supply voltages extracted by the voltage extraction control circuit.

5. The power transmission system according to claim 1, wherein
at least one of the two types of voltage output portions has a switching element which prevents input or output of a high voltage when a voltage higher than or equal to a prescribed value appears on the power connection line, wherein the high voltage is the voltage higher or equal to the prescribed value.

* * * * *